(12) United States Patent
Lee

(10) Patent No.: US 7,222,984 B2
(45) Date of Patent: May 29, 2007

(54) HAND OPERATED FLASHLIGHT

(76) Inventor: Wen Sung Lee, 8F-2, No. 60-2, Gong Yeh Chu 1st Road, Taichung 40767 (TW)

(*) Notice: Subject to any disclaimer, the term of this patent is extended or adjusted under 35 U.S.C. 154(b) by 0 days.

(21) Appl. No.: 11/355,720

(22) Filed: Feb. 16, 2006

(65) Prior Publication Data
US 2006/0245182 A1    Nov. 2, 2006

(30) Foreign Application Priority Data
Apr. 28, 2005    (TW) ................. 94206678 U

(51) Int. Cl.
*B60Q 1/00* (2006.01)
*H02J 7/00* (2006.01)

(52) U.S. Cl. ............ 362/192; 362/183; 362/200; 320/123

(58) Field of Classification Search ......... 362/192, 362/183, 200–202; 320/123, 160; 322/38
See application file for complete search history.

(56) References Cited

U.S. PATENT DOCUMENTS

| | | | | |
|---|---|---|---|---|
| 2,424,700 A | * | 7/1947 | McMath | 362/192 |
| 4,360,860 A | | 11/1982 | Johnson et al. | 362/192 |
| 4,563,629 A | * | 1/1986 | Keiper | 320/134 |
| 4,701,835 A | * | 10/1987 | Campagnuolo et al. | 362/192 |
| 4,907,474 A | * | 3/1990 | Bolger | 475/14 |
| 5,552,973 A | * | 9/1996 | Hsu | 362/192 |
| 5,563,629 A | * | 10/1996 | Caprara | 345/160 |
| 5,975,714 A | * | 11/1999 | Vetorino et al. | 362/192 |
| 6,563,269 B2 | * | 5/2003 | Robinett et al. | 315/86 |
| 6,959,999 B2 | * | 11/2005 | Lee | 362/192 |

* cited by examiner

*Primary Examiner*—Ali Alavi
(74) *Attorney, Agent, or Firm*—Charles E. Baxley

(57) ABSTRACT

A flashlight includes one or more light devices for being energized to generate light, one or more chargeable batteries are received in the housing and coupled to the light device for energizing the light device, an electric generating device is received in the housing, and rotatable or drivable by an actuating device. A directing device is coupled between the electric generating device and the chargeable battery for preventing an anti-phase electric current from flowing toward the chargeable battery and for preventing the chargeable battery from being damaged by the anti-phase electric current. A coupler may be coupled to the electric generating device for coupling to various electric facilities.

10 Claims, 7 Drawing Sheets

HAND OPERATED FLASHLIGHT

BACKGROUND OF THE INVENTION

1. Field of the Invention

The present invention relates to a flashlight, and more particularly to a flashlight having a manually operatable device to generate electric energy for energizing flashlights or other electric facilities and/or for charging the rechargeable batteries of the flashlight.

2. Description of the Prior Art

Typical flashlights comprise one or more batteries received in a housing, and coupled to one or more light bulbs, to energize the light bulbs, and to generate lights, such as flashlights, for lighting the dark environment.

Most of the batteries are not chargeable, and should be discarded away after the electric energy of the batteries have been consumed. The other batteries may be rechargeable, and may thus be used again and again.

However, the typical rechargeable batteries are normally required to be disengaged from the flashlights, and then engaged into a charging sets, for allowing the flashlights to be charged by various electric power sources, such as the electric power sources of house families, of vehicles, of airplanes, etc.

It may take time to disengaged the batteries from the flashlights, and then engaged the batteries into the charging sets to charge the flashlights, and then engaged the batteries into the flashlights again. It may also take a long time, such as thirty minutes or longer, to charge the batteries with the charging sets. The batteries may not be charged and used right away.

In addition, in outdoors, there will be no electric power sources available, such that the batteries may not be charged outdoors, and such that the flashlights may not be used outdoors when the electric energy of the batteries have been consumed.

For solving such problems, some of the typical flashlights comprise a manually operatable device coupled to the rechargeable batteries which are then coupled to one or more light bulbs for generating electric energy to energize the light bulbs indirectly via the rechargeable batteries.

For example, U.S. Pat. No. 4,360,860 to Johnson et al. discloses one of the typical self contained hand held portable lantern flashlights which comprises a manually operated generator for being operated by a rotatable handle to charge rechargeable batteries at a high rate for a short time.

However, when the rotatable handle is rotated in a different or reverse direction contrary to the normal or correct driving direction, the manually operated generator may be damaged, i.e., no protective device has been provide to prevent the manually operated generator from being damaged when the rotatable handle is rotated in the different or reverse direction contrary to the normal or correct driving direction.

The present invention has arisen to mitigate and/or obviate the afore-described disadvantages of the conventional flashlights.

SUMMARY OF THE INVENTION

The primary objective of the present invention is to provide a flashlight including a flashlight including a manually operatable device to generate electric energy for energizing flashlights or other electric facilities and/or for charging the rechargeable batteries of the flashlight.

The other objective of the present invention is to provide a flashlight including a protective device for preventing the manually operated generator from being damaged when the rotatable handle is rotated in the different or reverse direction contrary to the normal or the correct driving direction.

In accordance with one aspect of the invention, there is provided a flashlight comprising a housing including a front opening, a circuit board received in the housing, at least one light device received in the opening of the housing for being energized to generate light out of the housing, at least one chargeable battery received in the housing and coupled to the light device for energizing the light device, an electric generating device received in the housing, and including a spindle, a pinion attached to the spindle of the electric generating device, an actuating device including a follower rotatably attached to the housing, and including a handle pivotally attached to the follower for rotating the follower relative to the housing, and including a knob rotatably attached to the handle, to allow the handle to be rotated relative to the housing, a gearing device received in the housing and coupled between the follower of the actuating device and the electric generating device, to allow the electric generating device to be actuated by the actuating device via the gearing device, and to generate electric current to energize the light device, and a directing device coupled between the electric generating device and the chargeable battery for preventing an anti-phase electric current from flowing toward the chargeable battery and for preventing the chargeable battery from being damaged by the anti-phase electric current.

The directing device includes a diode for guiding an electric current to flow from the electric generating device to the chargeable battery and for preventing the anti-phase electric current from flowing toward the chargeable battery.

A filtering device may further be provided and coupled to the directing device for rectifying the electric current generated by the electric generating device. A voltage stabilizing device may further be provided and coupled between the directing device and the chargeable battery for stabilizing the electric current from the directing device and for protecting the chargeable battery.

A coupler may further be provided and coupled to the electric generating device for coupling to an electric facility and for outputting the electric current to the electric facility. A voltage stabilizing device may further be provided and coupled between the directing device and the coupler for stabilizing the electric current from the directing device to the coupler.

A switch device may further be provided and coupled between the voltage stabilizing device and the coupler for controlling the electric current to flow from the voltage stabilizing device to the coupler. The switch device is coupled to the chargeable battery for switching off the electric current from the electric generating device to the chargeable battery and for controlling the electric current to only flow to the coupler.

The housing includes a plate having a cavity formed by a casing for receiving the electric generating device. The housing includes a reflector having at least one hole for receiving the light device.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 2:
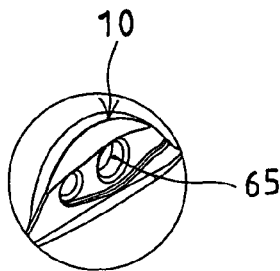
FIG. 2 is an enlarged partial perspective view illustrating the rear portion of an outer housing of the flashlight.

Referring to the drawings, and initially to FIGS. 1–8, a flashlight in accordance with the present invention comprises a housing 10 including such as a cover 11 attached or secured on top of a base 12 with such as fasteners 90. The cover 11 includes a peripheral rib 13 extended downwardly from the bottom peripheral portion thereof for engaging into a peripheral groove 14 of the base 12, for making a water tight seal between the cover 11 and the base 12.

Figure 1:
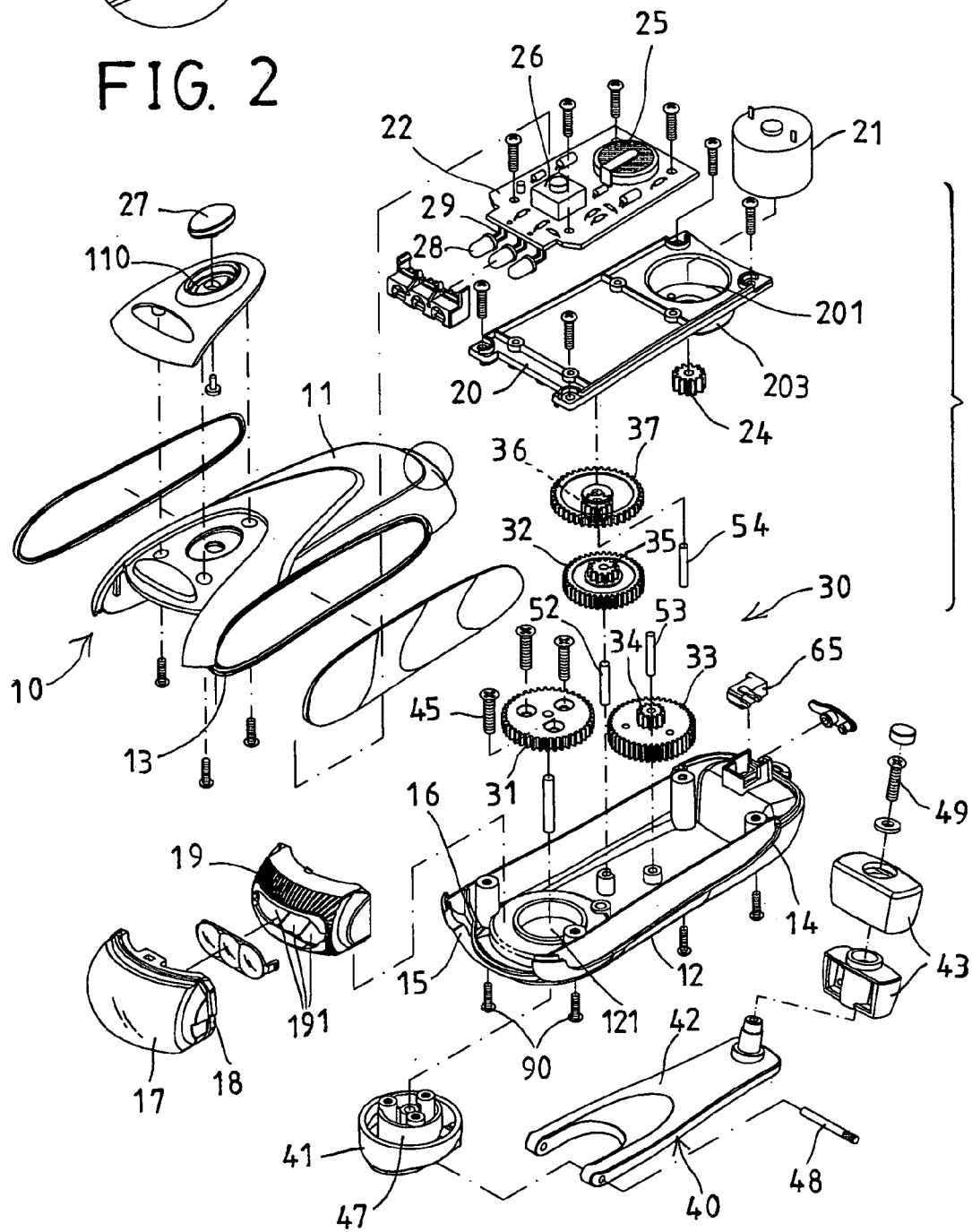
FIG. 1 is an exploded view of a flashlight in accordance with the present invention.
Figure 4:
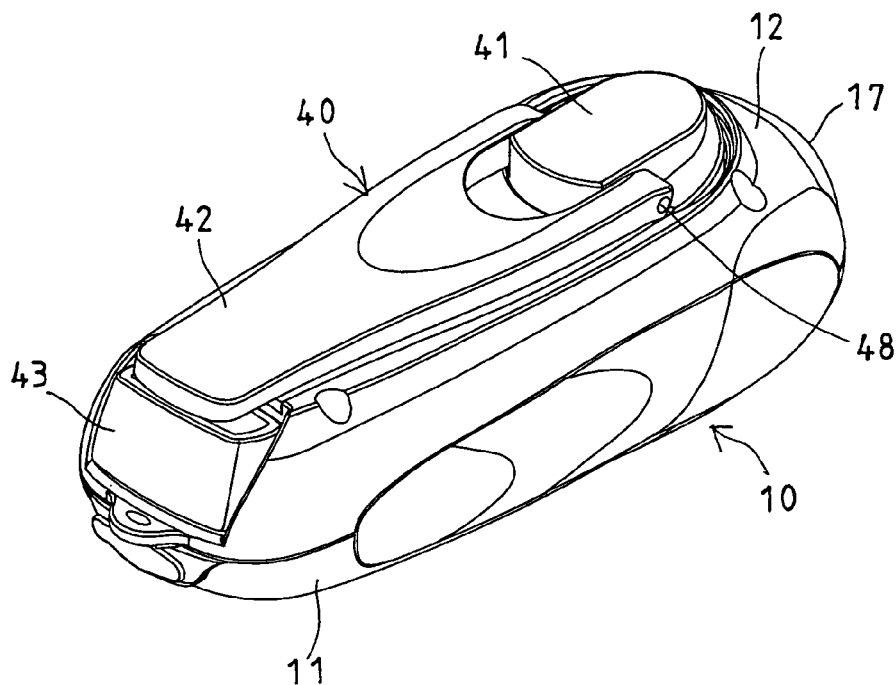
FIG. 4 is a bottom perspective view of the flashlight.
Figure 3:
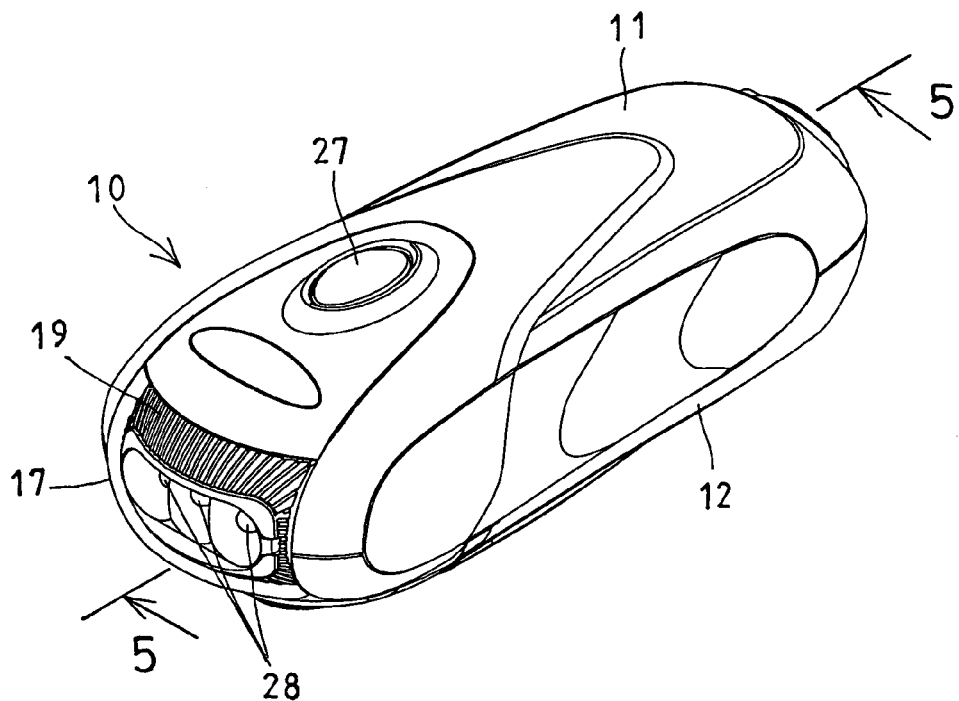
FIG. 3 is an upper perspective view of the flashlight.
Figure 5:
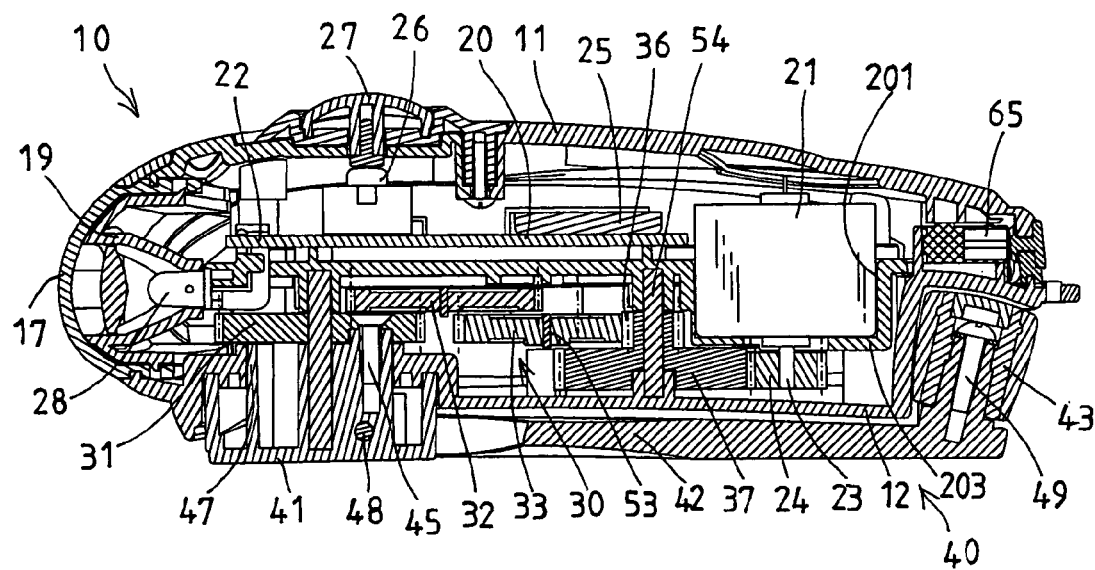
FIG. 5 is a cross sectional view of the flashlight, taken along lines 5—5 of FIG. 3.
Figure 6:
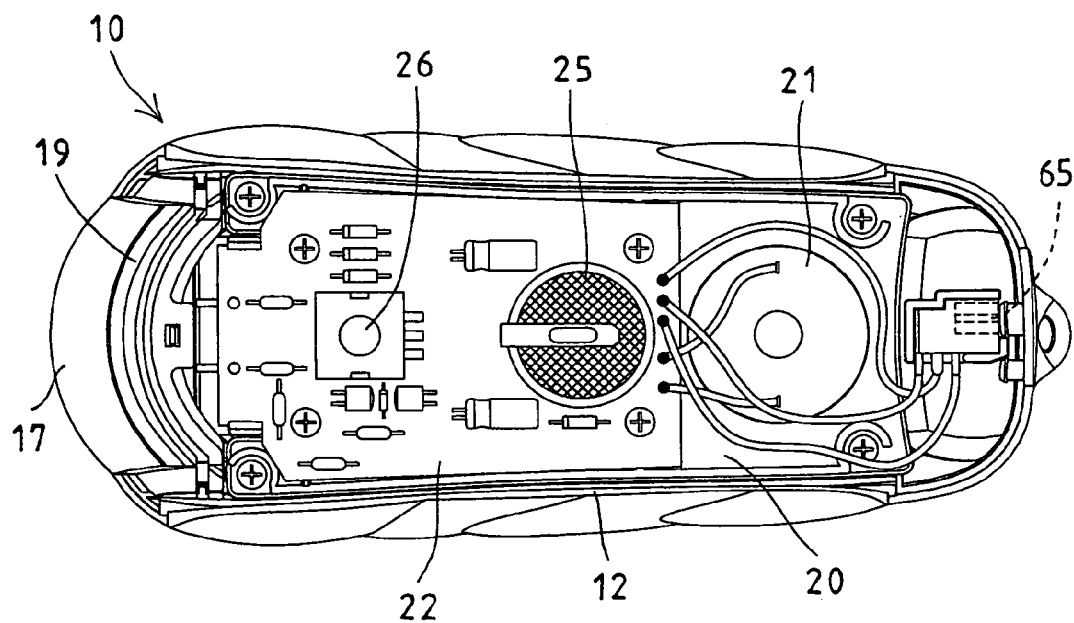
FIG. 6 is an upper plan schematic view of the flashlight, in which an upper housing member has been removed for showing the inner structure of the flashlight.

The housing 10 includes a front opening 15 formed therein, to receive a lens or transparent hood 17 therein, and includes one or more flaps 16 extended therein to engage into the corresponding depressions 18 of the hood 17, and to stably secure the hood 17 in the front opening 15 of the housing 10. A reflective member 19 is received in the front portion of the housing 10, and/or engaged in the hood 17, and includes one or more holes 191 formed therein (FIG. 1).

A plate 20 is secured in the housing 10, such as secured between the base 12 and the cover 11 with the fasteners 90, and includes a cavity 201 formed therein and defined by a casing 203, to receive a hand pump or electric generator or electric generating device 21 therein. The electric generating device 21 includes a rotor or a spindle 23 extended outward therefrom (FIGS. 5, 7, 8), and a pinion 24 secured to the spindle 23, so as to be rotated or driven by the electric generating device 21.

A circuit board 22 is supported or secured on top of the plate 20, and one or more chargeable batteries 25, such as lithium or lithium-chloride batteries 25, are disposed on the circuit board 22, and one or more switch members 26 are attached to the circuit board 22 for controlling purposes. A button 27 is slidably received in an opening 110 of the cover 11 of the housing 10 (FIG. 1), and disposed above and coupled to the switch member 26, for actuating or operating or depressing the switch member 26.

One or more light devices 28, such as light bulbs, light emitting diodes, illuminating members etc., are attached to the circuit board 22, and coupled to the batteries 25 and/or the switch member 26 (FIGS. 10, 11), for being switched or controlled by the switch member 26. The light devices 28 are engaged through the holes 191 of the reflective member 19, to generate lights that may be reflected and/or concentrated by the reflective member 19. The light devices 28 and/or the batteries 25 and/or the switch member 26 may preferably be coupled to the electric generating device 21 by such as electric wires 29 (FIG. 1).

The switch member 26 may control either or some or all of the light devices 28 to generate lights, and/or may control the light devices 28 to generate sparkling lights or flash lights or other light forms. An actuating device 40 includes a follower 41 having a conduit 47 rotatably received in an orifice 121 of the base 12 of the housing 10 (FIG. 1), and includes a handle 42 having one end pivotally secured to the follower 41 with a shaft 48, for allowing the handle 42 to be rotated relative to the follower 41 and the housing 10 between a folded or storing position (FIGS. 4, 5) and an open or working position (FIGS. 8, 9).

Figure 8:
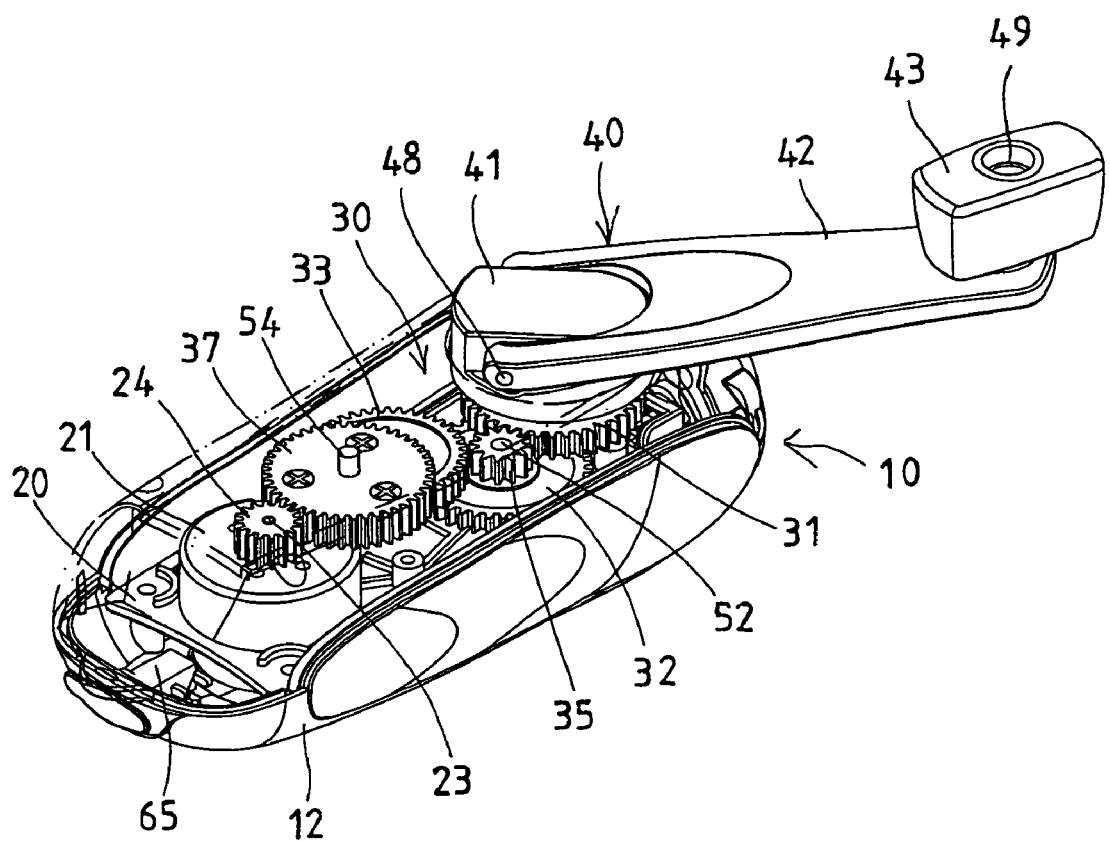
FIG. 8 is a bottom perspective view illustrating the operation of the flashlight.
Figure 7:
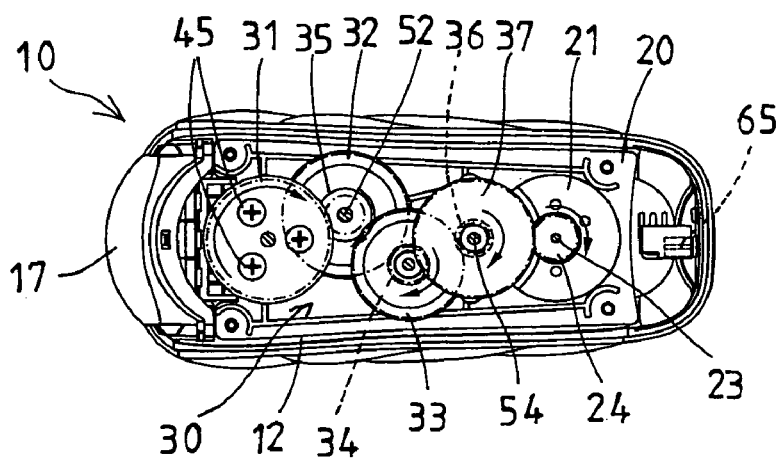
FIG. 7 is a bottom plan schematic view of the flashlight, in which a lower housing member has been removed for showing the inner structure of the flashlight.
Figure 9:
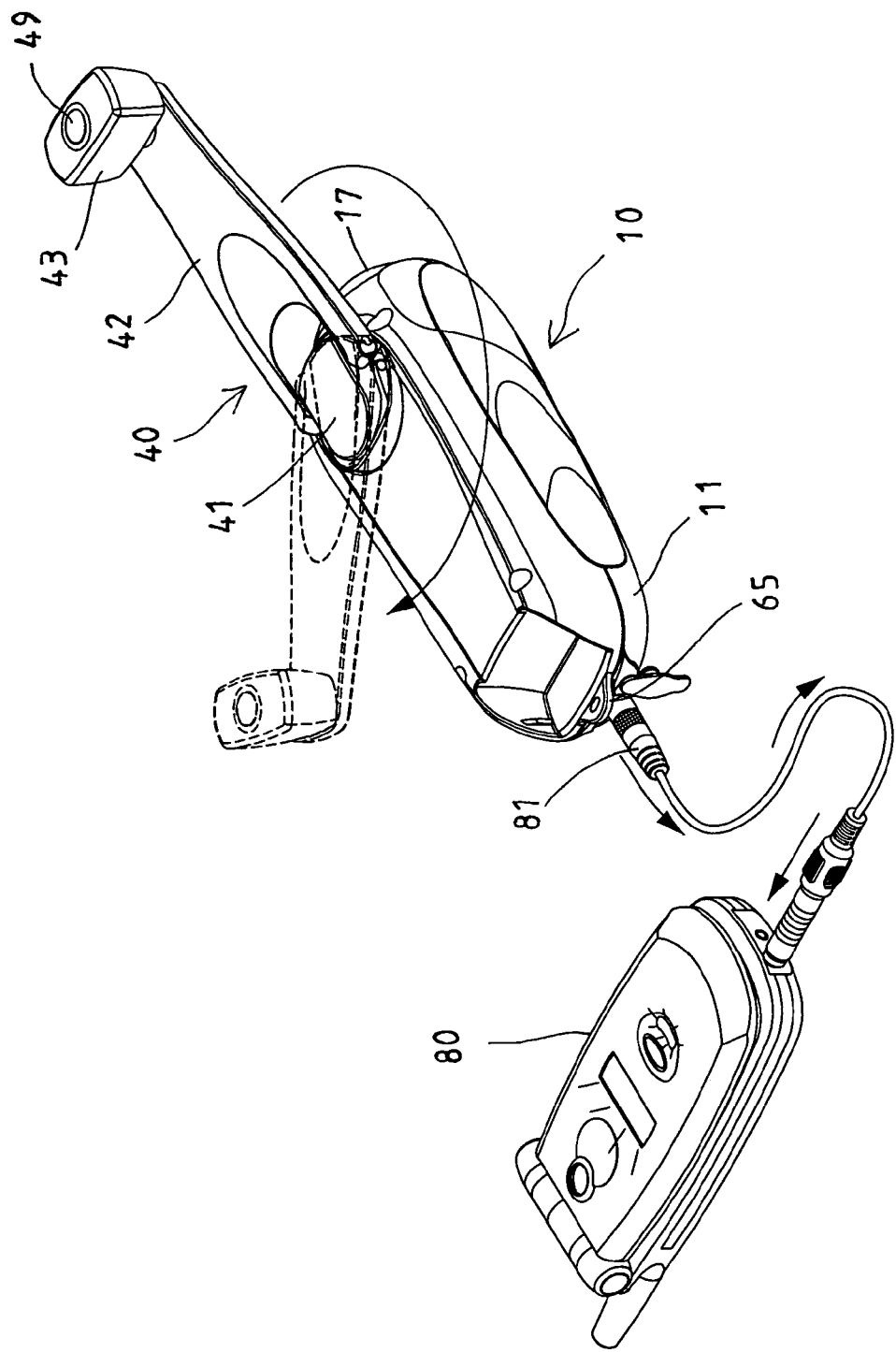
FIG. 9 is a bottom perspective view similar to FIG. 8, illustrating the application of the flashlight.

A knob 43 may be rotatably secured to the other end of the handle 42 with a fastener 49, to allow the follower 41 to be rotated relative to the housing 10 with the handle 42 by holding the knob 43, best shown in FIGS. 8 and 9. A gearing device 30 is further provided and coupled between the actuating device 40 and the electric generating device 21, for allowing the electric generating device 21 to be actuated or operated by the actuating device 40 via the gearing device 30.

As shown in FIGS. 1, 5, 7, 8, the gearing device 30 includes a gear 31 secured to follower 41 with one or more fasteners 45 and rotated in concert with the follower 41. Another gear 32 is rotatably secured to the base 12 of the housing 10 with a pin 52, and includes a pinion 35 engaged with the gear 31. A further gear 33 is rotatably secured to the base 12 of the housing 10 with another pin 53, and includes a pinion 34 engaged with the gear 32.

A still further gear 37 is rotatably secured to the base 12 of the housing 10 with a further pin 54, and includes a pinion 36 engaged with the gear 33. The gear 37 is engaged with the pinion 24 of the electric generating device 21, such that the pinion 24 of the electric generating device 21 may be actuated or operated or rotated by the handle 42 of the actuating device 40 via the gears 31, 32, 33, 37 and the pinions 35, 34, 36 of the gearing device 30. The gear 37 may includes one or more weights (not shown) attached thereto for increasing the weight of the gear 37, and/or for increasing the stability or moment of inertia of the gear 37, and thus for allowing the pinion 24 of the electric generating device 21 to be effectively rotated by the gear 37.

In operation, as shown in FIGS. 8 and 9, the pinion 24 of the electric generating device 21 may be rotated or driven by the gearing device 30 and by rotating the handle 42 of the actuating device 40, such that the electric generating device 21 may be actuated to generate electric energy, and to directly energize the light devices 28 or to indirectly energize the light devices 28 via the batteries 25, or to charge the batteries 25. The switch member 6 may control or switch on and off the light devices 28.

The weights in the gear 37 may increase the moment of inertia of the gear 37, such that the pinion 24 of the electric generating device 21 may be effectively rotated or driven by the gearing device 30 and by rotating the handle 42. For example, when the handle 42 is rotated for about one minute, the electric energy generated by the electric generating device 21 is good enough to energize the light devices 28 for up to forty minutes; or is good enough to charge the batteries 25 and then to energize the light devices 28 for up to forty minutes. The above-identified structure is typical and will not be described in further details.

Figure 10:
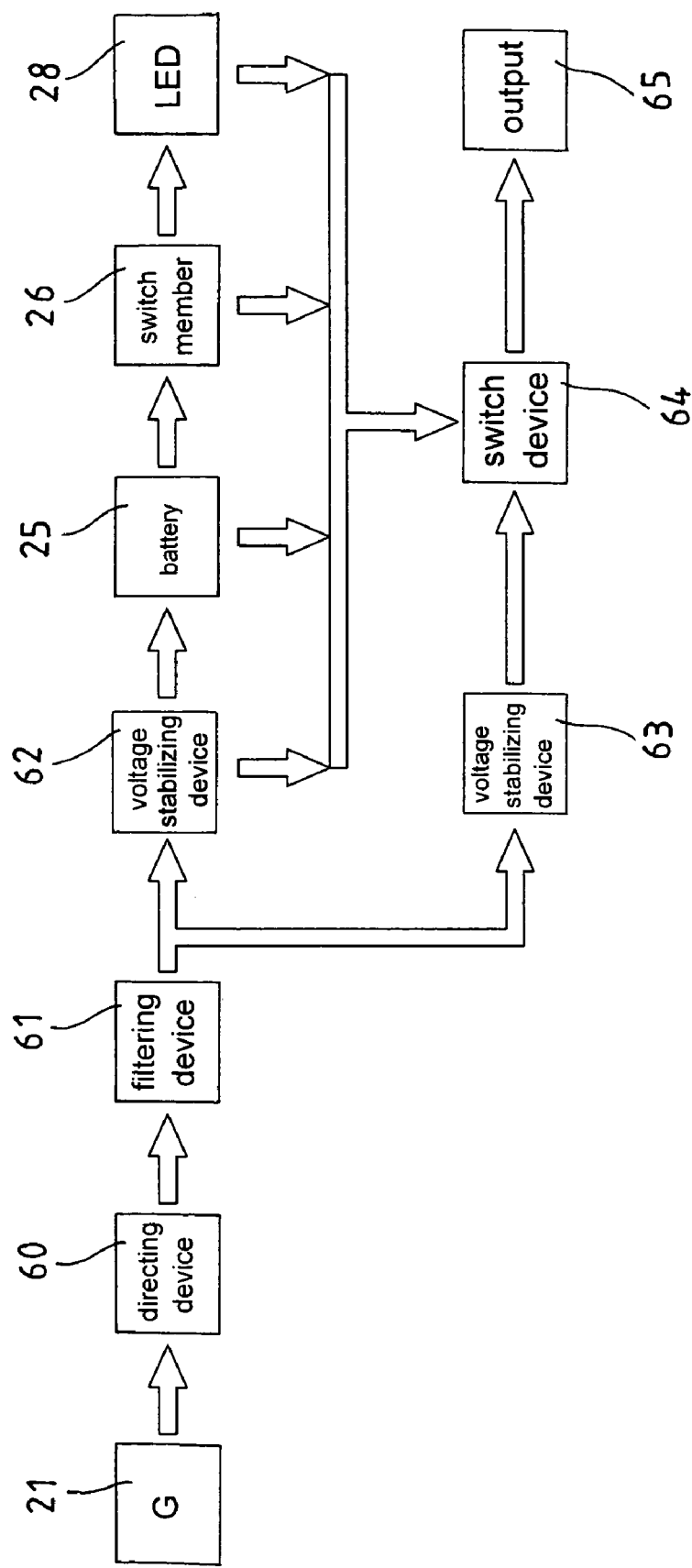
FIG. 10 is a block diagram illustrating the electric circuits of the flashlight.
Figure 11:
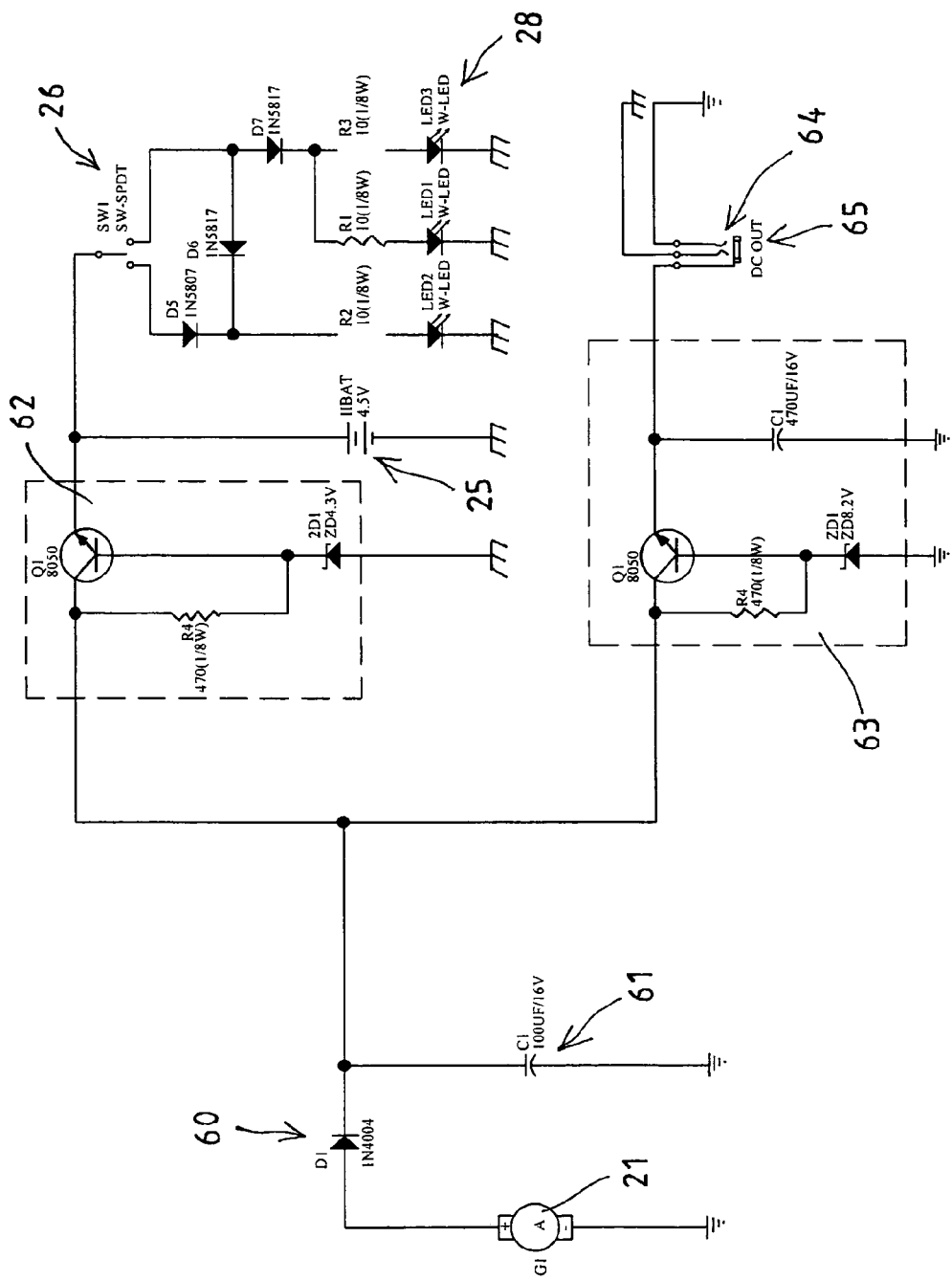
FIG. 11 is a plan schematic view illustrating the electric circuits of the flashlight.

Referring next to FIGS. 10 and 11, the flashlight in accordance with the present invention further includes an electric flow or current guiding or directing device 60 coupled to the electric generating device 21 and made of or formed by such as a diode (FIG. 11), or the directing device 60 includes a diode for limiting or for guiding the electric flow or current to flow from the electric generating device 21 to the light devices 28 and for preventing the anti-phase electric current from flowing toward and to damage the other electric parts or elements, such as the chargeable batteries 25, the light devices 28, or the like.

For example, when the rotatable handle 42 of the actuating device 40 is rotated in the different or reverse direction contrary to the normal or the correct driving direction, an anti-phase electric current may be generated by the electric generating device 21 and may be blocked by the electric current directing device 60, for preventing the anti-phase electric current generated by the electric generating device 21 from flowing toward the other electric parts or elements, such as the chargeable batteries 25 or the light devices 28 which may be damaged by the anti-phase electric current.

A filtering device 61 is coupled to the electric current directing device 60 for filtering or rectifying the electric current generated by the electric generating device 21, and a first voltage stabilizing device 62 is coupled between the directing device 60 or the filtering device 61 and the chargeable batteries 25 for stabilizing the electric current from the directing device 60 or the filtering device 61 and/or for preventing the over-voltage electric current from flowing to the chargeable batteries 25 and thus for protecting the chargeable batteries 25 from being damaged by the over-voltage electric current.

Another or a second voltage stabilizing device 62 is coupled between the directing device 60 or the filtering device 61 and a switch circuit or device 64 which is then coupled to such as a socket or coupler 65 for outputting the electric current to various electric facilities 80, such as portable or mobile phones 80 as shown in FIG. 9, radios or tape recorders (not shown), other light devices (not shown), or other electric facilities 80, and the electric facilities 80 may be coupled to the coupler 65 via such as a socket or plug or coupler 81 (FIG. 9).

The second voltage stabilizing device 62 may be provided for stabilizing the electric current from the directing device 60 or the filtering device 61, and/or for preventing the over-voltage electric current from flowing to the switch device 64 and the output coupler 65 and thus for protecting the other electric facilities 80 from being damaged by the over-voltage electric current. The switch device 64 may also be coupled to the second voltage stabilizing device 62 and/or the chargeable batteries 25 and/or the switch member 26 and/or the light devices 28 for allowing the chargeable batteries 25 to selectively energize the other electric facilities 80 that are coupled to the coupler 65.

In operation, as shown in FIG. 8, the electric generating device 21 may be driven or powered by the gearing device 30 and by rotating the handle 42 of the actuating device 40 to generate electric energy or current, and the electric energy or current may be supplied to charge the batteries 25 and/or to directly energize the light devices 28, and/or to energize the other electric facilities 80 that are coupled to the coupler 65. The switch member 6 may control or switch on and off the light devices 28.

It is preferable that, when the other electric facilities 80 are coupled to the coupler 65, the switch device 64 may be used to switch off or cut off the electric energy or current to the batteries 25 and to control the electric energy or current to only flow to the coupler 65 or to only energize the other electric facilities 80 are coupled to the coupler 65, for example. Or, the switch device 64 may be used to supply the electric energy or current from the batteries 25 to energize the other electric facilities 80 simultaneously or in addition to the electric energy or current generated by the electric generating device 21.

Accordingly, the flashlight in accordance with the present invention includes a manually operatable device to generate electric energy for energizing flashlights or other electric facilities and/or for charging the rechargeable batteries of the flashlight, and includes a protective device for preventing the manually operated generator from being damaged when the rotatable handle is rotated in the different or reverse direction contrary to the normal or the correct driving direction.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A flashlight comprising:
   a housing including a front opening,
   a circuit board received in said housing,
   at least one light device received in said opening of said housing for being energized to generate light out of said housing,
   at least one chargeable battery received in said housing and coupled to said at least one light device for energizing said at least one light device,
   an electric generating device received in said housing, and including a spindle,
   a pinion attached to said spindle of said electric generating device,
   an actuating device including a follower rotatably attached to said housing, and including a handle pivotally attached to said follower for rotating said follower relative to said housing, and including a knob rotatably attached to said handle, to allow said handle to be rotated relative to said housing,
   a gearing device received in said housing and coupled between said follower of said actuating device and said electric generating device, to allow said electric generating device to be actuated by said actuating device via said gearing device, and to generate electric current to energize said at least one light device, and
   a directing device coupled between said electric generating device and said at least one chargeable battery for preventing an anti-phase electric current from flowing toward said at least one chargeable battery and for preventing said at least one chargeable battery from being damaged by the anti-phase electric current.

2. The flashlight as claimed in claim 1, wherein said directing device includes a diode for guiding an electric current to flow from said electric generating device to said at least one chargeable battery and for preventing the anti-phase electric current from flowing toward said at least one chargeable battery.

3. The flashlight as claimed in claim 1 further comprising a filtering device coupled to said directing device for rectifying the electric current generated by said electric generating device.

4. The flashlight as claimed in claim 1 further comprising a voltage stabilizing device coupled between said directing device and said at least one chargeable battery for stabilizing the electric current from said directing device and for protecting said at least one chargeable battery.

5. The flashlight as claimed in claim 1 further comprising a coupler coupled to said electric generating device for coupling to an electric facility and for outputting the electric current to the electric facility.

6. The flashlight as claimed in claim 5 further comprising a voltage stabilizing device coupled between said directing device and said coupler for stabilizing the electric current from said directing device to said coupler.

7. The flashlight as claimed in claim 6 further comprising a switch device coupled between said voltage stabilizing device and said coupler for controlling the electric current to flow from said voltage stabilizing device to said coupler.

8. The flashlight as claimed in claim 7, wherein said switch device is coupled to said at least one chargeable battery for switching off the electric current from said electric generating device to said at least one chargeable battery and for controlling the electric current to only flow to said coupler.

9. The flashlight as claimed in claim 1, wherein said housing includes a plate having a cavity formed by a casing for receiving said electric generating device.

10. The flashlight as claimed in claim 1, wherein said housing includes a reflector having at least one hole for receiving said at least one light device.

* * * * *